United States Patent [19]

Goede

[11] Patent Number: 5,728,962

[45] Date of Patent: Mar. 17, 1998

[54] REARRANGING ARTISTIC COMPOSITIONS

[75] Inventor: Darryl Goede, Edmonton, Canada

[73] Assignee: Airworks Corporation, Nassau, Bahamas

[21] Appl. No.: 454,128

[22] PCT Filed: Mar. 14, 1994

[86] PCT No.: PCT/US94/02716

§ 371 Date: Jun. 7, 1996

§ 102(e) Date: Jun. 7, 1996

[87] PCT Pub. No.: WO95/25312

PCT Pub. Date: Sep. 21, 1995

[51] Int. Cl.$^6$ .............................. G10H 7/00; G10H 7/02
[52] U.S. Cl. .............................. 84/609; 84/602; 84/603; 84/642; 84/645; 84/649; 84/477 R; 395/2.87
[58] Field of Search .............................. 84/602–607, 609, 84/642, 645, 649, DIG. 29, 477 R, 478, 610, 634; 395/2.87

[56] References Cited

U.S. PATENT DOCUMENTS

| | | | |
|---|---|---|---|
| 4,757,540 | 7/1988 | Davis | 381/34 |
| 4,868,687 | 9/1989 | Penn et al. | 360/13 |
| 5,029,153 | 7/1991 | Tomoda et al. | 369/83 |
| 5,231,239 | 7/1993 | Tsumura et al. | 84/609 |
| 5,483,619 | 1/1996 | Blanchard | 395/2.87 |

*Primary Examiner*—William M. Shoop, Jr.
*Assistant Examiner*—Marlon T. Fletcher
*Attorney, Agent, or Firm*—Arent Fox Kintner Plotkin & Kahn

[57] ABSTRACT

A method is provided for automatically rearranging a plurality of digital information units (DIU) arbitrarily designated in a first digital information file (DIF), each DIU containing data with artistic structure and characteristics, to create a plurality of second DIF's having different artistic structure and characteristics from the first DIF. The method includes a first process for automatically (1) reordering, (2) repeating, (3) creating alternate sequences of, (4) altering durations of, (5) including and excluding certain ones of, and (6) automatically manipulating the characteristics of the plurality of DIU.

18 Claims, 3 Drawing Sheets

REARRANGING ARTISTIC COMPOSITIONS

SPECIFICATION

BACKGROUND OF THE INVENTION

This invention relates to rearranging digital information with the use of a computer. In one aspect, the invention relates to rearranging sections of a music soundfile.

Many applications, such as multimedia, or radio and television advertisements, require set-length audio tracks to be produced. The usual method of doing this uses analog equipment. Audio tape is physically sliced with razor blades and reassembled to the desired length or recombined in a different order. Obviously, this technique is very labor-intensive and time-consuming. It also requires a high level of aural training. A technique which eliminates the need for musical skills in the sound editing process would be very desirable.

Each rearrangement of a musical composition using the prior art techniques as above required investments of time and training. A technique to cut down on the time and training required to produce rearrangements is needed.

The production of alternative versions of a rearrangement is often impractical using the prior an techniques because of time and expense constraints. While other computer music editing programs allow the user to manipulate digitally sampled audio data, the user must still make decisions about where edit points will be and in what order to rearrange the resulting pieces. The user must ensure that the final product comes as close as possible to the desired length. A technique to automatically generate new versions of a rearrangement having different musical characteristics and/or length would be very desirable.

SUMMARY OF THE INVENTION

In one embodiment of the invention, there is provided a process for forming a tool which can be used for the rearrangement of digital information files, such as music files. To practice the process, there is provided a digital information file and a digital instruction file which correlates to information in the digital information file. Appropriate edit points for the digital information file are determined and marker points are assigned to the instruction file which correlate to the previously determined edit points for the digital information file. The instruction file is then stored. The process is characterized in that the digital information file is of an artistic composition having continuity and structure and the edit points divide the artistic composition into units each having continuity and structure. When used with soundfiles, MIDI files, (Musical Information Digital Interface files), or motion image files, the process results in the identification of "blocks" of digital information which can be used to produce rearrangements of the original. When the edit points are professionally chosen, rearrangements based on the blocks will be as high in quality as if the new version was constructed by the professional editors themselves.

In another embodiment of the invention there is provided a process for rearranging a digital information file. To practice the process, there is provided a digital information file and a digital instruction file which divides the digital information file into a first arrangement of digital information units. A plurality of the digital information units are combined to form a second arrangement of digital information units, each unit in the second arrangement being taken from the first arrangement. The process is characterized in that the digital information file is of an artistic composition having continuity and structure and the digital instruction file comprises a plurality of predetermined markers. The location of the markers is based on artistically appropriate edit points for dividing the digital information file into a plurality of units. Each unit should have structure and continuity, and a beginning and an ending denoted by a marker. The process is especially useful for rearranging music as well as other art forms that lend themselves to recombinance, such as video and animation. When the edit points have been professionally predetermined for a soundfile, for example, it is a simple matter for a relatively untrained technician to produce a rearrangement having professional quality. The time required to produce the rearrangement is much less than would be required by highly skilled professionals using prior art techniques. When the process is carried out on a high speed computer, it is generally possible to produce a multiplicity of rearrangements for any given length. Further, in the case of music, the process does not require the user to be knowledgeable in any capacity about music editing practices or music theory.

In yet another embodiment of the invention, there is provided a system for forming an instruction file for use in rearranging an artistic composition. Suitable artistic compositions are those having structure and continuity which are dividable into units each having structure and continuity by edit points. The system includes a computer. A digital information file containing the artistic composition is operatively associated with the computer. At least one output user interface is operatively associated with the computer for outputting information relating to the composition from the computer to a user. Retrieval instructions are provided for causing the computer to retrieve and output the information relating to the composition to the user through the at least one output user interface. Instructions are also provided for causing the computer to establish sample addresses for the digital information file. An input user interface is operatively associated with the computer to enable a user to input edit points for the digital information file. Correlation instructions are provided for causing the computer to correlate a sample address for each input edit point. A computer memory means is operatively associated with the computer for storing the sample addresses correlated with the edit points. Storage instructions are provided for causing the computer to store the sample addresses in the memory means. The system is characterized by instructions for causing the computer to repeatedly output selected units in a loop through the at least one output user interface. By using the system to repeatedly play the units in this manner, the accuracy of the edit points can be verified.

In yet another embodiment of the invention, there is provided a process for using a computer system as just described. The process is characterized by the steps of inputting edit points to identify the beginning of units of the digital information file which form an appropriate beginning for a rearranged composition and executing the storage instructions. This results in the production of an instruction file which is easy to use for the making of artistically rearranged compositions.

In another embodiment of the invention, there is provided a system for rearranging an artistic composition having structure and continuity to form a new version. The system includes a computer, a digital information file, an instruction file, and a user interface. The digital information file of the artistic composition is operatively associated with the computer. The digital information file is one which is dividable into units each having structure and continuity by edit points. The edit points divide the digital information file into units each having continuity and structure. The output interface is for outputting digital information file units in a cognitive form to a user. The system is characterized by the instruction file. The instruction file comprises a computer memory, correlation instructions, and retrieval instructions. The instruction file is operatively associated with the computer and stores sample addresses which correlate with appropriate edit points for the digital information file. The correlation instructions correlate each sample address in the instruction file with the beginning of a unit in the digital information file for which it marks the beginning. The retrieval instructions are for causing the computer to retrieve for uninterrupted output through the output interface a plurality of units from the digital information file. The plurality of units constitutes the new version of the composition. The system provides the user with the essentials for producing professional quality rearrangements.

In yet another embodiment of the invention, there is provided a computer memory device containing a digital information file and an instruction file. The digital information file is for an artistic composition having structure and continuity. The instruction file tracks the digital information file and contains marker points which correlate with appropriate edit points for the artistic composition. In the case of musical compositions, a computer memory device can be produced containing professionally positioned marker points for any musical composition, subject to the rights of the owner of the copyright owner, of course. The number of new musical pieces which can be produced from such devices is nearly limitless.

DETAILED DESCRIPTION OF THE PREFERRED EMBODIMENTS

The term "edit point" is intended to mean a point in an artistic composition which a human editor has determined is an appropriate breaking point in the flow pattern between two adjacent passages or sections in the artistic composition. In the case of music, the edit points are preferably selected to correlate with zero crossings in a display of the audio waveform of the music. The zero crossing is intended to mean the point on the display where a pulse of (+) electrical sign is shown to cross the horizontal axis of the display to become a pulse of (−) electrical sign, or vice versa. The term "marker point" is intended to mean a stored point in computer memory or a computer memory device which correlates with a selected edit point. The marker points can be imbedded in the information file which stores the artistic composition, or stored in a different information file. Where the marker points are stored in a different information file, the marker points generally represent a measurement of time from either the beginning of the composition or from another marker point. In the case of digitized music, it is convenient for the marker points to represent frame number, preferably a frame number at which a zero crossing occurs. The marker points are used to divide the information file containing the artistic composition, which is preferably in digital form, into "sections" or "blocks" of information between markers from which new versions of the artistic composition may be formed using recombinance techniques.

Figure 1:
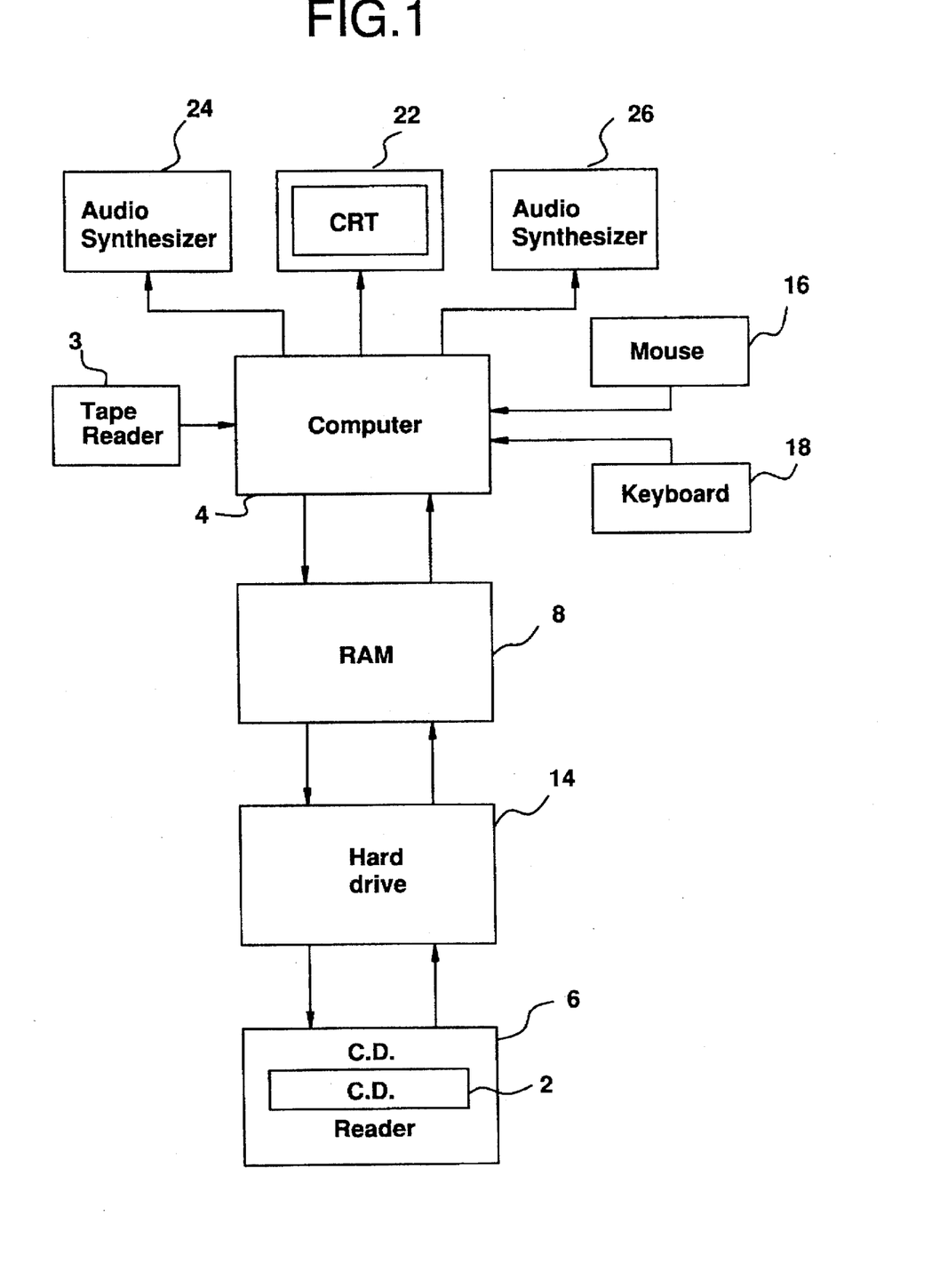
FIG. 1 is a block diagram of the system for forming an instruction file for use in rearranging an artistic composition.

In one embodiment of the invention as shown in FIG. 1, there is provided the combination of a digital information file and a digital instruction file. The digital information file is for an artistic composition having structure and continuity, such as a music or a motion image work. The digital instruction file tracks the digital information file and contains marker points which correlate with appropriate edit points for the artistic composition. In a preferred embodiment, the digital information file and the digital instruction file are supplied on a compact disc 2, although they can be separately provided and accessed using the system or process of the invention and provide good results. The combination is useful for producing rearrangements of the digital information file.

Although it is believed that the invention will have its greatest application in rearranging music, it is expected to have application for such things as choreographing dance routines and arranging marching band routines as well as to provide data for virtual reality games, and educational and entertainment games, and for training simulators such as for aircraft. The images of the motion image file can thus be of real life figures, caricatures, blocks, stick figures etc., depending on the application.

FIG. 1 illustrates a system which can be used to practice certain embodiments of the invention. In forming the inventive combination, a magnetic tape reader 3, such as a DAT machine, is generally operated in conjunction with a computer 4, although a compact disc reader could generally be used if desired. The computer 4 is operably associated with a random access computer memory means 8 and a hard drive 14. The computer 4 is provided with instructions to cause the computer to transfer the digital information from the magnetic tape reader to the hard drive. The term "instructions" as used herein, means instructions to cause a computer to perform a task. The instruction file operates in the random access memory 8, accessing the digital information file in the hard drive as needed. Preferably, the digital information file comprises a plurality of digital information frames of digital samples, each digital information frame being identifiable by a frame number.

The system also includes various user interfaces 16, 18, 22, 24 and 26 which can be categorized as input user interfaces and output user interfaces. At least one input user interface is electronically coupled to the computer for inputting instructions from a user to the computer to cause the computer to execute instructions. At least one output user interface for outputting the digital information file units to a user in a cognitive form is electronically coupled to the computer for outputting the information received from the digital information file. Preferably, the input user interfaces comprise a mouse 16 and a keyboard 18. The system also includes output user interfaces 22, 24, and 26 electronically coupled to the computer for outputting audio and visual information from the computer to the user. In the illustrated embodiment, the output user interfaces comprise a cathode ray tube screen 22 and audio synthesizers 24 and 26.

Figure 2:
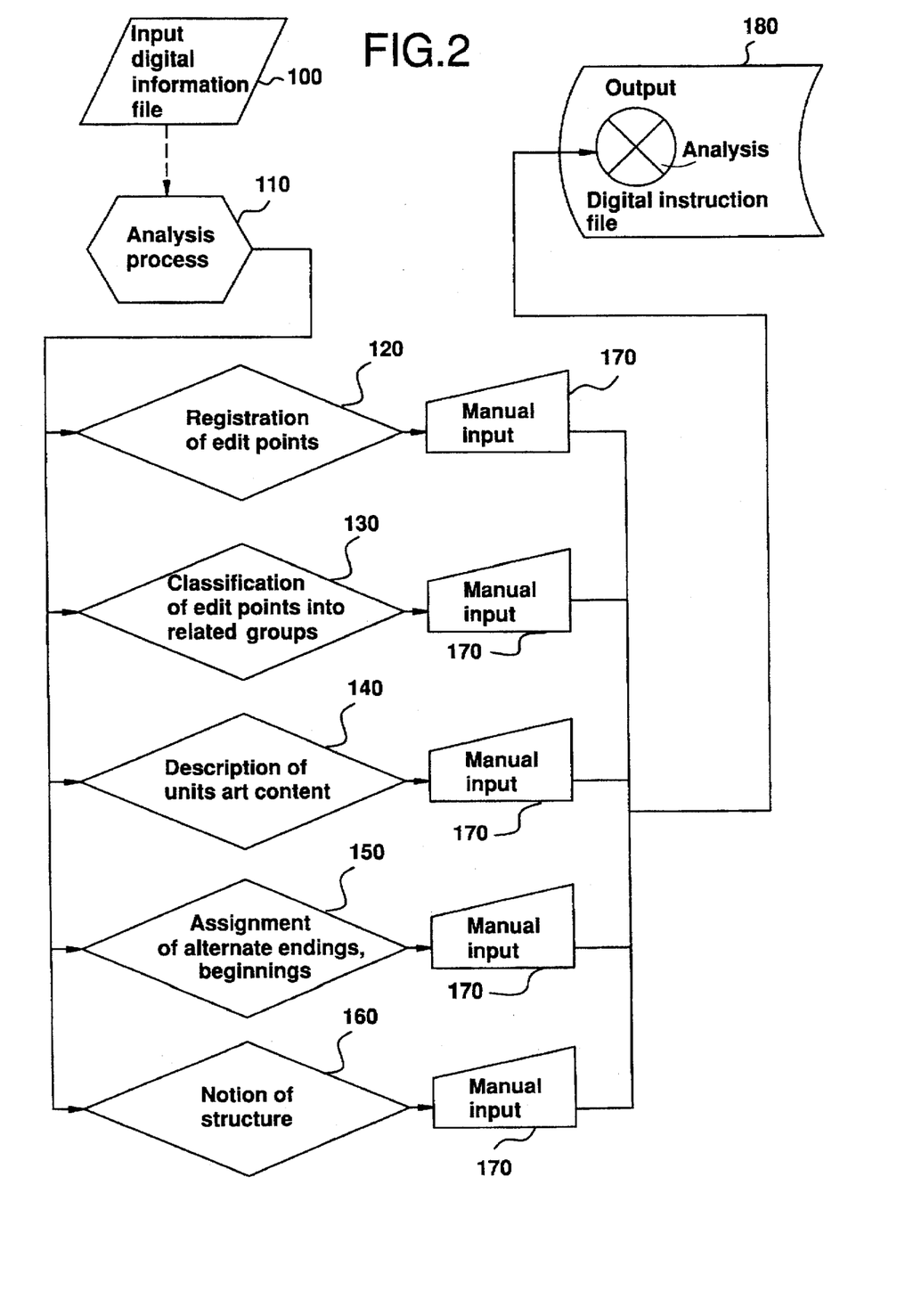
FIG. 2 is a flowchart illustrating the steps in the process for forming a digital instruction file as described by the present invention.

The system just described can be used to form a marker file portion of the digital instruction file as show in FIG. 2. The marker file comprises a plurality of predetermined markers based on artistically appropriate edit points for dividing the digital information file into a plurality of units, each unit having structure and continuity, and having a beginning and an ending denoted by a marker. The process of forming a digital instruction file 180 of the present invention comprises the steps of: (a) analyzing the artistic structure of the digital information file 100 by observing a video display of the waveform of the digital information file as shown in step 110 of FIG. 2, this analysis step 110 comprising the sub-step of registering all appropriate edit points correlated with zero crossing points (points where the positive waveform crosses the horizontal axis of the display to become negative) as shown in step 120. In the preferred embodiment, each digital information unit is comprised of a sequence of events and the markers are assigned to mark a starting event for the sequence of events. In a particularly preferred embodiment, the digital information file comprises a soundfile or a MIDI file of a musical composition or an imagefile of a motion image work. The events in the sequence of events are tones in the case of the soundfile or MIDI file and images in the case of the imagefile. The next sub-step 130 of the analysis process 110 comprises classifying the edit points into smaller groups of the edit points based upon the selection of one edit point in a subportion of music for an appropriate starting event in that subportion of music, the subportion being defined by the step 140 of analyzing the characteristics of the musical composition and determining artistically-pleasing subportions of the musical composition. As shown in step 170, the user then arbitrarily indicates certain ones of the edit points which are then stored in step 180 as marker points, the stored assigned marker points forming a digital instruction file.

Each starting event in the case of the soundfile or MIDI file is capable of being expressed as a point in a measure of music. Each edit point in the case of the imagefile is capable of being expressed as a starting position for a first event in a sequence of images forming a unit. For soundfiles, at least a major portion of the marker points, preferably substantially all of the marker points, are assigned to mark the beginning of a musical section of the soundfile which forms an appropriate beginning for a musical composition. The marker points for the soundfile should be validly chosen so that rearrangements will be artistically pleasing. Where the soundfile is pulse code modulated and has an audio waveform, the marker points are generally assigned to the zero crossings in the graphical view of the audio waveform of the soundfile. This is conveniently accomplished by displaying the audio waveform on the cathode ray tube 22 while outputting the music through the synthesizers 24 and 26. Appropriate edit points for the digital information file are determined and marker points are assigned to the instruction file, preferably by frame number. The marker points correlate to the previously determined edit points for the digital information file and are input through the mouse 16 or keyboard 18.

Further in the case of music it is desirable to have short musical sections or blocks available for incorporation into the new version file to trim length. Repeated sections of music in the original version can be broken up to provide this. Where the soundfile contains at least one repeated musical section, marker points are preferably assigned to subdivide one of the repeated musical sections into measures. The appropriateness of the edit points can be checked by repeatedly playing the musical section of the soundfile determined by the edit points in a loop, and to this end, it is preferred that the computer be further provided with instructions for causing the computer to repeatedly output selected units in a loop through the at least one output user interface so that the accuracy of the edit points can be verified. The instruction file and completed marker file is collected or assembled on the hard drive for eventual transfer to a read only memory device, optionally with the digital information file. Generally speaking, the digital information file together with the digital instruction file will be transferred to a CD-video or CD-audio device, because these types of computer memory devices are commercially available, although other forms of computer memory devices could be used as well.

Figure 3:
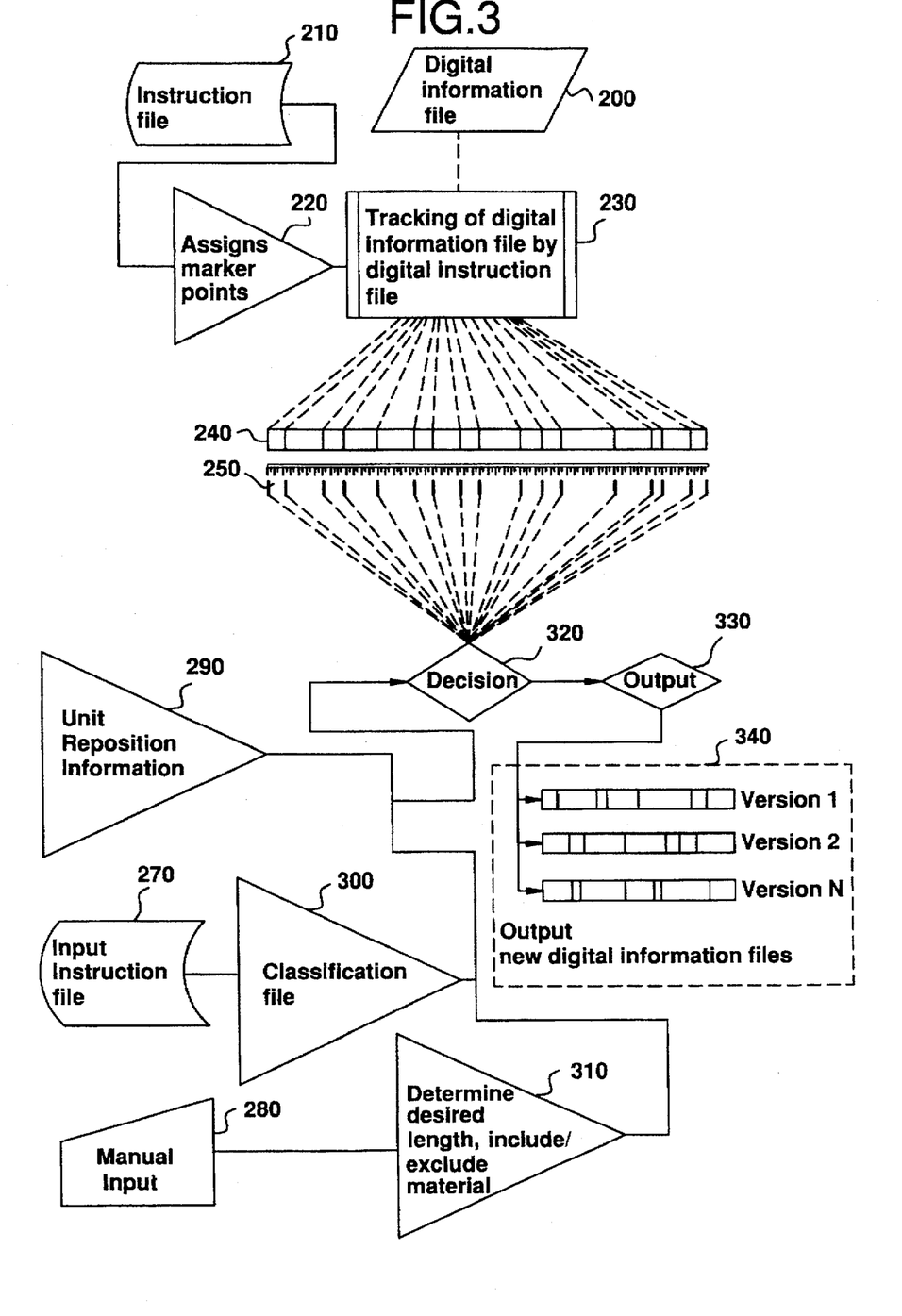
FIG. 3 is a flowchart illustrating the steps in the automatic editing process used in rearranging a digital information file as disclosed in the present invention.

To use the system to rearrange digital information files, there is provided a digital information file and a digital instruction file which tracks the digital information file. The digital information file and the digital instruction file can be stored on a compact disc 2 (shown in FIG. 1). For rearranging applications, the computer is generally operated in conjunction with a compact disc reader 6 which contains the compact disc 2. The computer 4 is provided with suitable instruction means to cause the computer 4 to transfer the digital information file originally stored on the compact disc 2 and the digital instruction file from the compact disc 2 to the hard drive 14. The digital instruction file is transferred to the random access memory means 8. The process of rearranging digital information files then proceeds by executing the instructions in the digital instruction file beginning with the step 220 of assigning marker points.

In a particularly preferred embodiment, step 230 in the process includes tracking of the digital information file by the digital instruction file through the use of correlation and retrieval instructions included in the digital instruction file correlation. The correlation instructions correlate each sample address in the instruction file with the beginning of a unit in the digital information file for which it marks the beginning. The retrieval instructions are for causing a computer to retrieve for uninterrupted output through user output interface a plurality of units from the digital information file. The process next performs the step 240 of dividing the digital information file into traits by arbitrarily selecting certain ones of the edit points and the step 250 of registering the selected edit points versus a timeline representing the length of time associated with the entire original artistic composition stored in the digital information file.

In one embodiment of the invention, the instruction file includes unit length information associated with the sample addresses for the beginning of the units; instructions for establishing a new version file containing a plurality of sample addresses together with length information; instructions for specifying a desired length for the new version file; instructions for calculating remaining available space in the new version file; instructions for automatically identifying a candidate unit to be considered for filing in the new version file based on the sample address and length information and available space in the new version file; and instructions for filing in the new version file the sample address and length information relating to a candidate unit which will fit into the remaining available space in the new version file. This information enables a computer, such as a 386 or 486, to automatically construct new versions of the digital information file.

Because an objective of one embodiment of the invention is to provide new versions of a specified length it is further desirable to provide the digital instruction file with instructions for iteratively filling the new version file with the sample addresses and length information relating to candidate units which will fit into the remaining available space in the new version file until the available free space is within predetermined limits of the desired length of the new version file as shown in steps 270 to 340 of FIG. 3.

Where the digital information file comprises a soundfile of a musical composition and the digital information units comprise blocks of the soundfile this aspect of the invention can be carried out by selecting a desired time of performance for the second arrangement as shown in step 310. The instructions automatically select the digital information units for combination so that the second arrangement will have about the desired time of performance.

Generally speaking, the original version can be characterized as a first arrangement of a first set of data blocks and the new version can be characterized as a second arrangement of a second set of data blocks. The first arrangement will generally have a first musical structure and the second arrangement will generally have a second musical structure. However, to provide a musically pleasing ending to new versions of musical composition, it is desirable to position the ending unit in the original version as the ending unit in the new version. Thus, as shown in step 290 instructions for determining position information about a unit relative to other units in the digital information file and instructions for positioning the ending unit of the digital information file as the last unit in the new version file are also preferred to be present in the instruction file. Preferably, instructions for causing the ending unit of the digital information file to be the first unit to be positioned in the new version file are also included. Although most any unit can be positioned as the opening unit in the new version, it is desirable to begin the new version with the same beginning as the original version. Thus, instructions for positioning the beginning unit of the digital information file as the beginning unit in the new version file are also preferably present. Most preferably, the beginning unit is the second unit to be positioned in the new version file. It is further desirable to preserve the flow of the original composition for musical rearrangements. Thus instructions for causing the progression of units in the new version file to generally follow the progression of the units in the digital information file are also preferably included in the instruction file. The order of progression is only generally followed, however because the instruction file permits the same digital music block from the first arrangement to appear in the second arrangement at more than one position and will perform iterations when the second arrangement is longer than the first arrangement or alternative versions are desired.

In one embodiment of the invention, each block in the original version of the soundfile carries frequency and amplitude information in digital form. By modulating the amplitude information when the blocks are recombined, the first arrangement will have a first set of musical characteristics and the second arrangement will have a second set of musical characteristics.

In the most preferred embodiment of the invention as shown in step 300, the digital instruction file further includes at least one classification file based on a common characteristic of the digital information file at certain starting events. Each such classification file is based on a single common characteristic. Each starting event in the case of the soundfile or MIDI file is capable of being expressed as a point in a measure of music. For these compositions, the common characteristic is the point in the measure which marks the beginning of the unit. Each starting event in the case of the imagefile is the starting position for the first event in the sequence of images forming the unit. The common imagefile characteristic is the starting position for the first event in the sequence. Also included are instructions for causing the computer to file at least two of the sample addresses which correlate to units having the common digital information file characteristic in their respective classification file; instructions for causing the computer to correlate the sample addresses in the classification file with the units of the digital information file; and instructions for causing the computer to retrieve and output to a user through user interfaces the units indicated by the sample addresses. More pleasing rearrangements can be formed when the plurality of digital information units combined to form the second arrangement are from the classification file.

Various aspects of a preferred embodiment of the invention are further described in the following example.

EXAMPLE

Background

The marker files of each piece of music are created by a program referred to as Autoblade using the soundfile of the desired piece of music as a template for placing the markers at appropriate sample addresses. The marker files contain all the instructions needed by a program referred to as TuneBuilder to perform its recombinances, and to alter the characteristics of the resultant new soundfile in various ways. The marker files as described in this example are therefore an "overlay" technology as opposed to an "embedded" technology, although they do not exclude combining the digital information file with the digital instruction file to form a new digital information file in an 'embedded' technology.

The marker files do not directly interact with or alter the existing soundfile in any way. In addition, the marker files may be physically separated from the soundfiles without affecting the results. So long as the original soundfile does not change, Tunebuilder can use the marker files as instructions at any time, as long as both the soundfile containing the original information and the marker files containing the recombinance instructions are accessible to TuneBuilder at the same time. The sound file and the marker files do not have to be distributed together.

What Autoblade does:

1. Identifies and marks a position on the soundfile relative to the beginning of the soundfile. This position is accurate to the sample, which in this case is 1/44,100 of a second.

2. Allows for the assigning of marker points to different families or classifications.

3. Automatically joins edit points to other edit points in the same family.

4. After the program recombines the sections into a new duration, AutoBlade adjusts for changes in dynamic level from one section to another.

5. Allows a marker point to be placed and moved on the screen while listening to the music track.

6. Allows for a compensation in the placing of the marker point while listening, equivalent to a user's reaction time.

7. Prepares a marker file set (instruction file) that is readable by TuneBuilder. TuneBuilder is a playback program discussed below that creates new recombinations of the musical sections that will meet a predetermined duration criteria.

The Procedure

Each piece of music (hereafter called a track), is a digitally sampled version of the music. It is usually first recorded onto DAT (digital audio tape). The digital data is then transferred into a sound file and transferred to hard disc. The format of the sampled data in the sound file is uncompressed PCM (pulse-code modulation) in 16-bit stereo samples, sampled at a rate of 44100 Hz, although the algorithm is applicable to virtually any format of data. In our process, we directly transfer the raw soundfile that exists on CD Audio, converting to an acceptable file format on the transfer. This file is then converted to the AIFF soundfile format.

The sound fie is then loaded into Autoblade, which displays a graphical view of the audio waveform for each of the left and right channels. The program allows the editor to place a visible markers where the valid edit point is to occur. These markers are a reference to the sample frame upon which the edit point occurs.

The collection of markers created for the sound data file are specific to that version of the sound data file. Since markers are referenced by sample frame number, they are independent of the sound file format being used. The markers refer to the sample frame in the 44100 Hz original data, whether the end user uses a lower quality sound format or not. The proprietary editor program is a tool used only to create markers.

Usage of Autoblade

1. There are various edit criteria that will exist simultaneously in each piece of music. The first step is to identify these and group them into a finite number of families. For example, there may be a family of edit points on "downbeats", another on beat "2 and", and another family on the "beat one". There is the ability to create an unlimited number of families files AutoBlade.
2. The family files are indicated by a different colored division lines on the viewing screen. Edit points are assigned to the desired family file by selecting the appropriate family file and placing the edit point into that family file. In other words, all the edit points on the "downbeat" are placed in a first family file, all the marker points on the "beat 2 and" are placed in a second family file, and all the marker points on "beat one" are placed in the third family file. Preferably, all the possible edit points in the music are identified, marked, and assigned to a family file. Some of the family files may have only two members.
3. If there are identical repeated sections, the first is cut into one bar phrases, the second in two bar phrases, the third In four bar phrases, etc.
4. The white marker on the viewer is active. This is the marker used to find the correct edit point.
5. The edit can be checked by zooming to the appropriate level. The section on either side of the marker can be selected by clicking the left mouse on it then playing with the right mouse button.
6. To check position, the entire window can be played, left edge up to selected marker, or after selected marker to window right edge, or by drag and play.
7. The program stores itself every 15 minutes or at any other predetermined frequency.
8. Some ways to quickly check accuracy of the edit:
    a. Loop the section two or three times and listen to how musical it is.
    b. Listen for a click at the end of the section. This means the cut has been made into the attack of the next beat or the cut has not been placed at a zero crossing. (This is generally audible to the sample, 1/44,100 of a second.)
    c. Randomly select sections, string them together and check the results.
9. In each family of marker points, the cut should always be made to the same position on the rhythm.
10. It is possible to cut to less than a measure and consider it as an edit family, as long as the cut is on the same position on the rhythm as every other cut contained in the other family members.
11. In a related point to number 2; if there are repeating sections, the first is desirably cut every two bars, the next every bar, and the next every two beats. The short sections are useful since the recombinance instructions in Tunebuilder call for small segments as well for the shorter automatic edit lengths.

TuneBuilder

The algorithm used to construct new versions takes into account the required length, how many versions have been previously generated for the specified length, number of markers in the original track, and the length of original track.

The user first chooses which track they want to edit. Digital data for each track may be distributed on CD-ROM (Compact Disc Read-Only Memory) in both CD-Audio (also known as Redbook format) and sound file versions (digital audio sample data stored in computer files on disc). Once the user chooses which track they want to work with, sound file data and associated marker data for it are copied from CD-ROM onto the user's hard disc drive. In original sound quality (16-bit stereo 44.1 KHz), each minute of audio data takes 10.584 Mb of disc space.

The user then specifies what length they want the new version to be. This length can be specified in seconds, video frames (30/sec), film frames (24/sec), or beats (from beats per minute value precalculated for the chosen track). This length value is then converted to a decimal seconds value by the software for internal calculations.

The algorithm keeps a total of how much free space is left in the desired length specified by the user. Each time a block is added to the new version, length of the block is subtracted from the total. When there is no space left, the algorithm recognizes that it is done, and the new version is ready for the user. The new version is represented as a list of blocks in a particular order. When constructing a new version, the initial state of the list is empty, and new blocks are added until desired length is reached.

The first block the program attempts to add to the list is the last block from the original track. This block is added at the end of the list so that it will appear as the last block in the new version. While almost any block can be used to create an acceptable beginning for a musical piece if the markers have been placed correctly, it is desirable to have the last block from the original version appear at the end of the new version. This is because in practice, not all blocks can be used as end blocks and still sound acceptable. Adding the last block to the list before adding any other blocks ensures that if there is insufficient space to add more blocks to the list, the new version will still sound acceptable. If the specified length of the new version is shorter than the length of the end block from the original version, the block is not added to the list because it would make the new version longer than the specified length. The current value of the amount of free space left is decremented by the length of the block added to the list.

If there is still room, the algorithm then chooses the first block in the original track to add at the front of the list. (If this is not the first version generated for this specified length, or the specified length is relatively short, then the algorithm acts differently). The amount of free space left is decremented by the size of this block and the algorithm continues.

The algorithm continues to iterate in the same manner until all free space is used. The next block added to the list is the second last, the second, then the third last, and the third, and so on, choosing from alternate ends of the original version, moving towards the middle until the list is filled.

When the new version is to be longer than the original, the algorithm starts as above until all of the original blocks have been placed, then iterates through the original version again, skipping the end blocks in the original version, and continues until the new version file is filled.

When alternate new versions are desired, the algorithm starts as above, positioning the beginning and ending blocks, and then fills toward the center, skipping random blocks in the original version, until the new version file is filled.

Other orders of recombinance are also possible within the algorithm. Priorities may be established using other criteria for the edit points, either masking them from being used by the algorithm or by establishing relationships between two or more sections or groups of sections.

I claim:

1. A process for forming a digital instruction file from a digital information file of an artistic composition having artistic continuity and structure comprising the steps of:
   (a) analyzing the artistic structure of said digital information file by observing a video display of the waveform of the digital information file, said video display having a horizontal axis and a vertical axis;
   (b) determining appropriate edit points within said digital information file, said appropriate edit points being the points where the positive portion of the waveform crosses the horizontal axis of the video display to become negative, said edit points dividing said artistic composition into a plurality of units, each of said plurality of units having artistic continuity and structure;
   (c) arbitrarily as signing marker points to selected ones of said edit points; and
   (d) storing said assigned marker points, said stored assigned marker points forming a digital instruction file.

2. The process as claimed in claim 1, wherein the digital information file comprises a plurality of digital information flames of digital samples, each of said digital information frames being identifiable by a unique frame number, and wherein the marker points are identified based on frame number.

3. The process as claimed in claim 2 wherein the units are comprised of a plurality of a sequence of events, predetermined ones of said edit points define a starting event for the sequence of events forming each of the units, and wherein the digital information file comprises a soundfile of a musical composition the events being tones in the the soundfile.

4. The process as claimed in claim 2 wherein the units are comprised of a plurality of a sequence of events, predetermined ones of said edit points define a starting event for the sequence of events forming each of the units, and wherein the digital information file comprises an imagefile of a motion picture image work, the events being images in the imagefile.

5. The process as claimed in claim 2 wherein the units are comprised of a plurality of a sequence of events, predetermined ones of said edit points define a starting event for the sequence of events forming each of the units, and wherein the digital information file comprises a MIDI file of a musical composition, the events being tones in the MIDI file.

6. The process as claimed in claim 3 further compromising the step of:
   establishing a classification file based on a common characteristic of the digital information file, said common characteristic determined by examining the starting events, wherein each starting event in the soundfile is capable of being expressed as a point in a measure of music and the common characteristic is a point in the measure of music which marks the beginning of the unit to be formed.

7. The process as claimed in claim 4 further comprising the step of:
   establishing a classification file based on a common characteristic of the digital information file, said common characteristic determined by examining the starting events, wherein each starting event in the imagefile is capable of being expressed as a starting position for a sequence of images and said common characteristic is the starting position for the first event in said sequence of images.

8. The process as claimed in claim 1 wherein at least a major portion of the marker points are assigned to mark the beginning of a musical selection of the soundfile, said beginning of said musical selection forming an appropriate beginning for a musical composition.

9. The process as claimed in claim 1 wherein the soundfile contains at least one repeated musical selection, and wherein said process further comprises the step of:
   assigning marker points to subdivide one of the repeated musical selections into a plurality of subportions.

10. The process as claimed in claim 1 wherein the marker points divide the soundfile into a plurality of musical selections, and wherein said process further comprises the step of:
    repeatedly playing one of said plurality of musical selections of the soundfile to check the appropriateness of the edit points.

11. A system for forming a digital instruction file for use in rearranging an artistic composition having artistic structure and continuity to form a rearranged composition, said artistic composition being dividable into units by edit points each of said units having structure and continuity, said system including
    a computer;
    a digital information file operatively associated with the computer, said digital information file including said artistic composition;
    at least one output user interface, operatively associated with the computer, for outputting information relating to the artistic composition from the computer to a user;
    retrieval instructions for causing the computer to retrieve and output the information relating to the artistic composition to the user through the at least one output user interface;
    address instructions for causing the computer to establish addresses for the digital information file;
    an input user interface, operatively associated with the computer, for inputting edit points in the digital information file;
    correlation instructions for causing the computer to correlate a sample address with each input edit point;
    a computer memory means, operatively associated with the computer for storing the sample addresses correlated with the edit points;
    storage instructions for causing the computer to store the sample addresses in the memory means, said stored correlated edit points forming said digital instruction file; and
    repeating instructions for causing the computer to repeatedly output a plurality of selected units in a loop through the at least one output user interface so that the accuracy of the edit points can be verified.

12. The system as claimed in claim 11 wherein the digital instruction file further comprises
    unit length information associated with the sample address for determining the beginning of the units;
    instructions for establishing a new version file including a plurality of sample addresses and length information;

instructions for specifying a desired length for the new version file;

instructions for calculating remaining length in the new version file;

instructions for automatically identifying a plurality of candidate units for filing in the new version file based on the sample address and remaining length in the new version file; and instructions for filing in the new version file the sample address and length information for any one of said candidate units which will fit into the remaining length of the new version file.

13. The system as claimed in claim 12 further comprising instructions for iteratively filling the new version file with the sample addresses and length information of any one of said candidate units which will fit into the remaining length of the new version file until the remaining length of the new version file is within predetermined limits of the desired length for the new version file.

14. The system as claimed in claim 12 further comprising instructions for determining position information of one of said units relative to other of said units in the digital information file; and instructions for positioning an ending unit of the digital information file as a last unit of the new version file.

15. The system as claimed in claim 14 further comprising instructions for causing the ending unit of the digital information file to be a first unit of the new version file.

16. The system as claimed in claim 15 further comprising instructions for positioning a beginning unit of the digital information file as a beginning unit of the new version file.

17. The system as claimed in claim 15 further comprising instructions for causing a progression of units of the new version file to follow a progression of the units in the digital information file.

18. The system as claimed in claim 12 further comprising instructions for causing the computer to establish a classification file based on a common digital information file characteristic of the plurality of units correlating to sample addresses in the digital instruction file;

instructions for causing the computer to file at least two of the sample addresses which correlate to said units having the common digital information file characteristic in the classification file;

instructions for causing the computer to correlate the sample addresses in the classification file with the units of the digital information file; and instructions for causing the computer to retrieve and output to a user through at least one of the plurality of user output interfaces the units correlated with the sample addresses.

* * * * *